Figure 1:
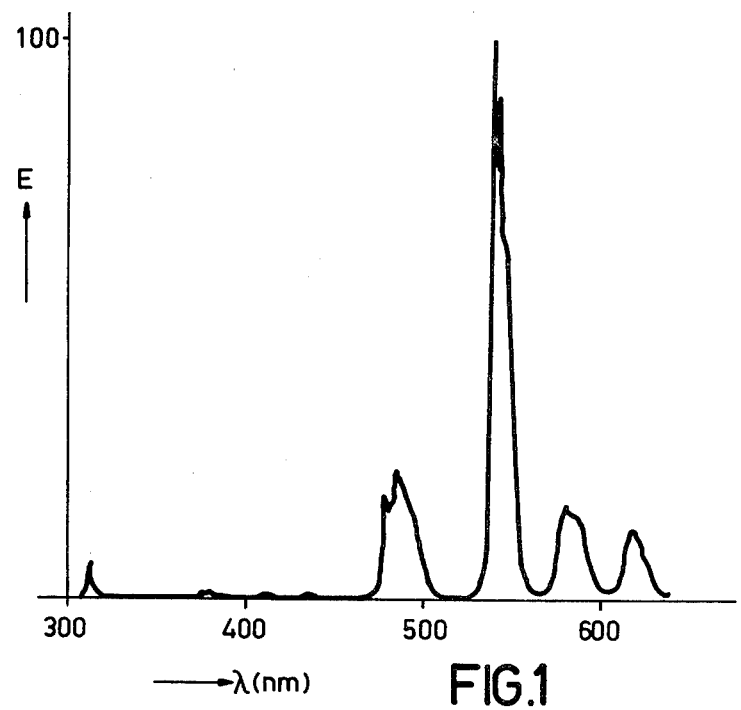

United States Patent [19]

De Hair et al.

[11] 4,215,289

[45] Jul. 29, 1980

[54] LUMINESCENT MATERIAL, LUMINESCENT SCREEN PROVIDED WITH SUCH A MATERIAL AND LOW-PRESSURE MERCURY VAPOR DISCHARGE LAMP PROVIDED WITH SUCH A SCREEN

[75] Inventors: Johannes T. W. De Hair; Gert M. Boogerd, both of Eindhoven, Netherlands

[73] Assignee: U.S. Philips Corporation, New York, N.Y.

[21] Appl. No.: 12,638

[22] Filed: Feb. 16, 1979

[30] Foreign Application Priority Data

Mar. 10, 1978 [NL] Netherlands ............................ 7802632
Jul. 5, 1978 [NL] Netherlands ............................ 7807274

[51] Int. Cl.$^2$ ............................................... C09K 11/46
[52] U.S. Cl. ............................. 313/486; 252/301.4 R; 252/301.4 P; 252/301.4 F; 428/539
[58] Field of Search .................. 252/301.4 F; 313/486; 428/539

[56] References Cited

U.S. PATENT DOCUMENTS

| | | | |
|---|---|---|---|
| 3,523,091 | 8/1970 | McAllister | 252/301.4 F |
| 3,909,443 | 9/1975 | Shaffer et al. | 252/301.4 F |
| 4,093,890 | 6/1978 | Verriet et al. | 252/301.4 F X |
| 4,151,443 | 4/1979 | Van Den Boom et al. | 313/486 X |
| 4,162,232 | 6/1979 | Yale | 252/301.4 F |

FOREIGN PATENT DOCUMENTS 78292 12/1970 Fed. Rep. of Germany .... 252/301.4 F
2118531 12/1971 Fed. Rep. of Germany .... 252/301.4 F

OTHER PUBLICATIONS

Schwarz, "Inorg. Nucl. Chem. Letters," vol. 3, pp. 231–236, 1967.

*Primary Examiner*—Jack Cooper
*Attorney, Agent, or Firm*—Norman N. Spain

[57] ABSTRACT

Luminescent material having a host lattice comprising, as one of the main constituents, at least one of the elements Y, La and the lanthanides. The material is activated by Gd, and, in addition by one or more of the elements Pb, Tl, Sb, Pr and Bi and comprises one or more of the elements Mn, Tb, Eu, Dy and Sm and the third activator. These materials have an efficient emission originating from the third activator and are used in low-pressure mercury vapour discharge lamps.

4 Claims, 6 Drawing Figures

LUMINESCENT MATERIAL, LUMINESCENT SCREEN PROVIDED WITH SUCH A MATERIAL AND LOW-PRESSURE MERCURY VAPOR DISCHARGE LAMP PROVIDED WITH SUCH A SCREEN

The invention relates to a luminescent material comprising a luminescent compound having a host lattice consisting of an inorganic crystalline compound which contains as one of the main constituents at least one element from the group yttrium, lanthanum and the lanthanides, this material being activated by at least 1 mole % gadolinium and, in addition, comprising at least 0.1 mole % of at least one second activator element and at least 0.1 mole % of at least one third activator element.

Netherlands Patent Application 7607724, which has been laid open to public inspection, describes lanthanum metaborates containing gadolinium and activated by bismuth and, in addition, by terbium and/or dysprosium and which are defined by the formula $La_{1-x-y-z}Gd_x Bi_y A_z B_3 O_6$, where A represents terbium and/or dysprosium and where $0 \leq x \leq 1$, $0.001 \leq y \leq 0.80$, $0 \leq z \leq 0.60$ and $x+y+z \leq 1$. Depending on the activator element chosen for A, these materials show the characteristic terbium or dysprosium emission. A condition to obtain an efficient terbium or dysprosium emission is that the materials contain gadolinium, preferably in relatively large quantities. A reason was not given and it was assumed that gadolinium only performs the role of a main constituent of the host lattice.

In general, luminescent materials consist of inorganic crystalline compounds as the host lattice in which a usually small quantity of an activator element is incorporated. An important group of host lattices for luminescent materials is formed by compounds containing an element of the group yttrium, lanthanum and the lanthanides as one of the main constituents. These host lattices, which will be denoted by rare earth lattices in the further course of this description may comprise in addition to said cations Y, La and the lanthanides, other cations, for example alkali metals and alkaline earth metals, as the main constituent.

Gadolinium-activated luminescent materials have been known for a long time (see, for example, the book by F.A. Kröger "Some Aspects of the Luminescence of Solids" (1948) page 293). Gd-activated rare earth lattices, specifically Gd-activated yttrium tantalate, are disclosed in an article by G. Blasse and A. Bril in J. Luminescence, 3 (1970) page 109.

A generally known phenomenon, which can be used with advantage in luminescent materials, is the phenomenon of the transfer of excitation energy from an activator element of one type (the so-called sensitizer) to an activator element of another type (the actual activator). This transfer may be complete, only the activator emission then being observed, or may be only partial, in which latter case sensitizer emission is obtained in addition to activator emission. A condition for the occurrence of energy transfer is often that the sensitizer has an emission in that portion of the spectrum where the activator can be excited.

It is known that transfer of excitation energy to gadolinium can take place in luminescent materials. An article by R. Reisfeld and Sh. Morag in Appl. Phys. Lett., 21 (1972) 57, describes, for example, thallium- and gadolinium-activated glasses. In these materials the exciting radiation is absorbed in the thallium, which serves as the sensitizer, and transferred to the gadolinium. In addition, it is known that gadolinium can perform the role of sensitizer. An article by R. Reisfeld in Structure and Bonding, 13 (1973) 53 discusses the energy transfer from gadolinium to terbium in luminescent materials. German Patent Specification No. 1,284,296 discloses gadolinium- and terbium-activated alkaline earth metal alkali metal borates.

A considerable drawback of many luminescent materials provided with a sensitizer and an activator is that in order to obtain a complete energy transfer to the activator, so as to obtain the largest possible emission of the desired activator radiation, a very high activator concentration is often required. However, such a high activator concentration generally results in so-called concentration quenching, and consequently very low luminous fluxes are then obtained. It is then necessary to use smaller quantities of the activator and than the energy transfer is not optimal. Materials in which high activator concentrations do not result in concentration quenching often have the drawback of being very expensive, because usually expensive rare earth metals are used as the activator.

It is an object of the invention to provide gadolinium-activated materials in which transfer of the excitation energy occurs and in which the concentration of the activator whose radiation is desired, may be small.

In accordance with the invention a luminescent material of the type defined in the preamble of this description is characterized in that the second activator element is at least one of the group bivalent lead, monovalent thallium, trivalent antimony, trivalent praseodymium and trivalent bismuth and the third activator element is at least one of the group bivalent manganese, trivalent terbium, trivalent europium, trivalent dysprosium and trivalent samarium, wherein a similar luminescent compound activated only by gadolinium and at least one of the second activator elements emits the characteristic line emission of gadolinium in the range from 310 to 315 nm. When excited by ultraviolet radiation having predominant wavelengths of 254 nm, but excluding luminescent compounds which are lanthanum metaborates activated by gadolinium and bismuth and, in addition by terbium and/or dysprosium.

The invention is based on the recognition that in rare earth metal lattices which contain gadolinium, one of said second and one of said third activator elements, an efficient transfer of the excitation energy can take place from the second activator element to the third activator element via the gadolinium. In principle this mechanism can occur in all crystalline rare earth metal lattices which are activated in the above-described manner. However, it appeared to be a condition that the material, if only activated by Gd and a second activator element (that is in the absence of a third activator element shows the characteristic line emission of Gd in the range from 310 to 315 nm, and possibly emission of the second activator element on excitation by short-wave ultraviolet radiation. The ultraviolet radiation to be used in this test for determining whether a rare earth lattice containing Gd is suitable for activation by a certain combination of second and third activator elements, is the mercury resonant radiation of a low-pressure mercury vapour discharge (predominantly consisting of wave lengths of approximately 254 nm).

It appeared that bivalent lead, monovalent thallium, trivalent antimony, trivalent praseodymium, and trivalent bismuth are suitable as the second activator element. These elements are used as sensitizer for the gadolinium. In addition, it appeared that bivalent manganese, trivalent terbium, trivalent europium, trivalent dysprosium and trivalent samarium can be used as the third activator element in these lattices, because the gadolinium can transfer its excitation energy to these dements. From the preceding it follows that in the materials according to the invention energy transfer is effected in two stages: from the second activator to the Gd and from the Gd to the third activator. In this process a mutual transfer between Gd ions may take place so that, also at low concentrations of the third activator, a complete transfer to this third activator can usually be obtained.

A considerable advantage of the luminescent materials according to the invention is that they may furnish an efficient emission from the third activator element, also at low concentrations of the third activator. Consequently the risk of concentration quenching is small and high luminouss fluxes can by obtained. In addition, a low concentration of the third activator generally results in less expensive materials.

An embodiment of a host lattice suitable for luminescent materials according to the invention is the lanthanum silicate $La_{14}Si_9O_{39}$ having a hexagonal apatite crystal structure. Preference is given to such a luminescent silicate which is defined by the formula $La_{14-x-y-z}Gd_xPb_yTb_zSi_9O_{39}$, where $0.30 \leq x \leq 14-y-z$ $0.005 \leq y \leq 1.5$ $0.05 \leq z \leq 3.5$ When excited by short-wave ultra-violet radiation, these silicates furnish the characteristic Tb-emission. From the above formula and the appended conditions, it appears that the lanthanum may be fully replaced by the activators and that the terbium concentration may be low.

A second embodiment of a host lattice suitable for luminescent materials according to the invention is the yttrium aluminium borate with a huntite crystal structure $YAl_3B_4O_{12}$. Preference is given to such a luminescent material which is defined by the formula $Y_{1-x-y-z}Gd_xBi_yDy_zAl_3B_4O_{12}$, where $0.1 < x < 1-y-z$ $0.001 \leq y \leq 0.1$ $0.001 \leq z \leq 0.1$ These materials, in which the yttrium may have been fully replaced by the activators, emit the characteristic dysprosium radiation in an efficient manner. These materials contain only a small quantity of expensive dysprosium compared to the much cheaper elements yttrium and gadolinium.

A further embodiment of a host lattice suitable for luminescent materials according to the invention is the lanthanum phosphate $LaPO_4$. Preference is given to such a luminescent phosphate defined by the formula $La_{1-x-y-z-a-b}Gd_xSb_yBi_zTb_aDy_bPO_4$ where $0 \leq a \leq 0.2$
$0 \leq b \leq 0.1$ $0.001 \leq a+b$ $0 \leq y \leq 0.1$ $0 \leq z \leq 0.1$ $0.001 \leq y+z$ $0.1 \leq x \leq 1-y-z-a-b.$ When activated by Sb and/or Bi and also by Tb, these phosphates furnish the predominantly green Tb-emission and when activated by Sb and/or Bi also and by Dy, these materials emit the substantially white Dy-emission.

Another luminescent material according to the invention is a borate defined by the formula $Gd_{1-x-y-z}La_xBi_yMn_zB_3O_6$, where $0 \leq x \leq 0.5$ $0.001 \leq y \leq 0.1$ $0.001 \leq z \leq 0.2$ When excited by short-wave ultra-violet radiation these borates furnish an efficient Mn-emission in the green part of the spectrum.

Still another embodiment of a host lattice suitable for luminescent materials according to the invention is the barium yttrium silicate $BaY_4Si_5O_{17}$ having a monoclinic crystal structure. Preference is given to such a luminescent material which is defined by the formula $Ba_{1-x}Sr_xY_{4-y-z-a-b}Gd_yPr_zSm_aDy_bSi_5O_{17}$, where $0 \leq x \leq 0.50$ $0.1 \leq y \leq 4-z-a-b$ $0.001 \leq z \leq 0.1$ $0 \leq a \leq 0.1$ $0 \leq b \leq 0.1$ $0.001 \leq a+b.$ These silicates, in which up to 50 mole % of barium may have been replaced by strontium without changing the luminescent properties to a significant extent and in which yttrium may be completely replaced by the activators, emit the characteristic red line emission of samarium when activated by samarium and the characteristic dysprosium radiation when activated by dysprosium.

The luminescent materials according to the invention can be used in luminescent screens, preferably luminescent screens for low-pressure mercury vapour discharge lamps. The emission of one or more of said third activator elements is often desired in such lamps, both for general lighting and for special applications.

The materials according to the invention can be prepared by methods which are conventional for the preparation of luminescent materials. A solid state reaction at a high temperature of a starting mixture of compounds of the constituent elements will generally take place.

Some embodiments of luminescent materials according to the invention will now be described with reference to a drawing and a number of examples for the preparation of these materials.

In the drawing

Figure 5:
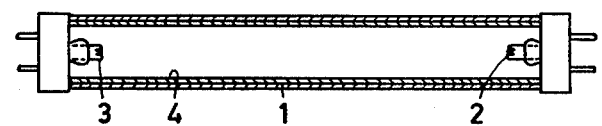

FIGS. 1, 2, 3, 4 and 6 show the spectral energy distribution of the emitted radiation of five luminescent materials according to the invention and FIG. 5 shows a low-pressure mercury vapour discharge lamp according to the invention.

EXAMPLE 1

A mixture is made of
5.254 g $La_2O_3$
0.931 g $LaF_3$
1.652 g $SiO_2$ (approximately 10% less than the stoichiometric amount)
1.813 g $Gd_2O_3$
0.467 g $Tb_4O_7$
0.112 g PbO.

This mixture was heated for 1 hour at 1200° C. in a nitrogen atmosphere. After cooling and pulverizing, the product was heated for 1 hour at 1350° C. in nitrogen. After cooling and pulverizing a material was obtained having a composition defined by the formula $La_{10.36}Gd_{2.80}Pb_{0.14}Tb_{0.70}Si_9O_{39}$. On excitation by short-wave ultraviolet radiation (predominantly 254 nm) the material furnished the characteristic Tb-emission with a quantum efficiency of 50%. FIG. 1 shows the spectral energy distribution of the emission. In this Figure the wave-length $\lambda$ in nm is plotted on the horizontal axis and the relative radiation intensity E in arbitrary units is plotted on the vertical axis. A small contribution of Gd emission is still visible in the range from 310 to 315 nm.

EXAMPLES 2 TO 5 INCLUSIVE

In a similar manner as described in Example 1 Luminescent silicates were prepared having different Gd, Pb and Tb contents. The following Table I shows the formulae of the materials obtained and the results of the quantum efficiency measurement (q in %) of each of these materials at 254 nm excitation. The spectra of the emitted radiation substantially corresponded to those of FIG. 1.

Table I

| Example | Formula | q(%) |
|---|---|---|
| 2 | $La_{8.61}Gd_{4.20}Pb_{0.14}Tb_{1.05}Si_9O_{39}$ | 50 |
| 3 | $La_{11.76}Gd_{1.75}Pb_{0.14}Tb_{0.35}Si_9O_{39}$ | 35 |
| 4 | $Gd_{13.51}Pb_{0.14}Tb_{0.35}Si_9O_{39}$ | 40 |
| 5 | $La_{10.22}Gd_{2.80}Pb_{0.28}Tb_{0.70}Si_9O_{39}$ | 50 |

EXAMPLE 6

A mixture was made of
1.333 g $Y_2O_3$
1.450 g $Gd_2O_3$
3.060 g $Al_2O_3$
4.944 g $H_3BO_3$
0.026 g $Bi_2O_2CO_3$
0.019 g $Dy_2O_3$.

Figure 2:
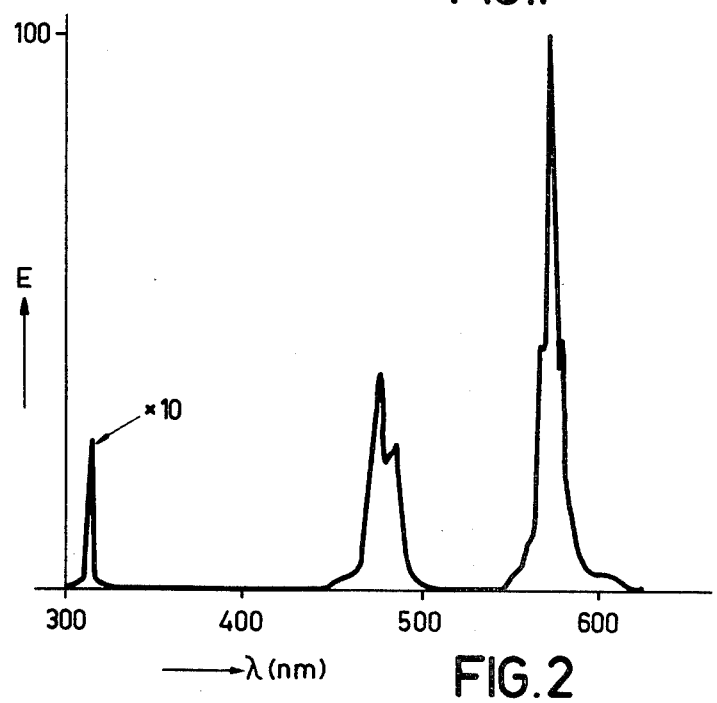

This mixture was heated in air in a furnace at 1200° C. for 1 hour. After cooling and pulverizing the product obtained was heated for 1 hour at 1200° C. in air. The luminescent material obtained is defined by the formula $Y_{0.59}Gd_{0.40}Bi_{0.005}Dy_{0.005}Al_3B_4O_{12}$ and has the huntite-crystal structure. On excitation by 270 nm radiation, the material luminesces with a quantum efficiency of 55% predominantly in two bands having maxima at approximately 475 and 575 nm, which are characteristic for the Dy-emission. FIG. 2 shows the spectral energy distribution of this material. Also here a small contribution to the emission in the range 310–315 nm originating from Gd is still visible. FIG. 2 shows this emission line at a 10x reduced scale.

EXAMPLES 7 AND 8

Two aluminate borates with different activator contents were prepared by methods similar to that described in Example 6. The formulae and q-values of these materials are summarized in Table II. These materials furnish Dy emission in an efficient manner.

Table II

| Example | Formula | q(%) |
|---|---|---|
| 7 | $Y_{0.89}Gd_{0.10}Bi_{0.005}Dy_{0.005}Al_3B_4O_{12}$ | 65 |
| 8 | $Gd_{0.99}Bi_{0.005}Dy_{0.005}Al_3B_4O_{12}$ | 30 |

EXAMPLE 9

A mixture was made of
8.881 g $Gd_2O_3$
2.281 g $La_2O_3$
9.281 g $La_2O_3$
9.244 g $(NH_4)_2HPO_4$
0.306 g $Sb_2O_3$
0.916 g $Tb_4O_7$.

Figure 3:
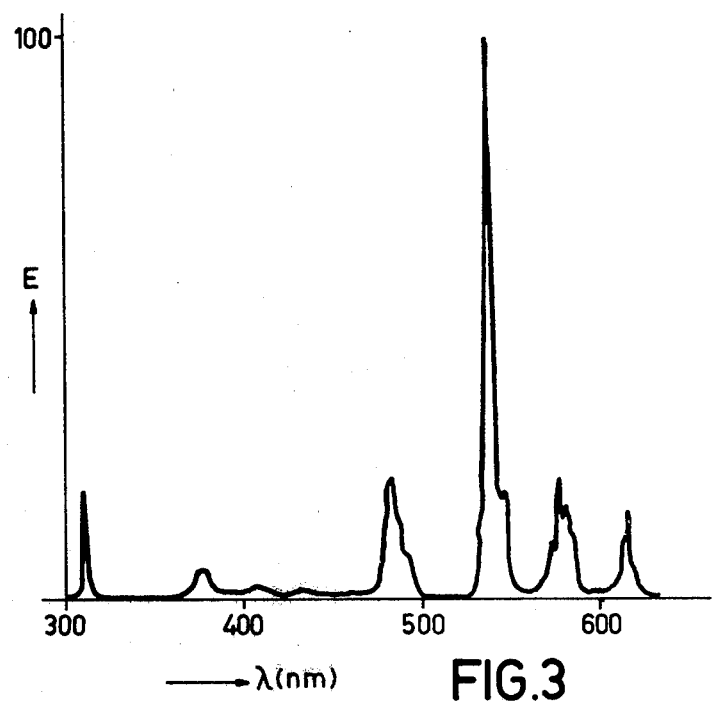
Figure 4:
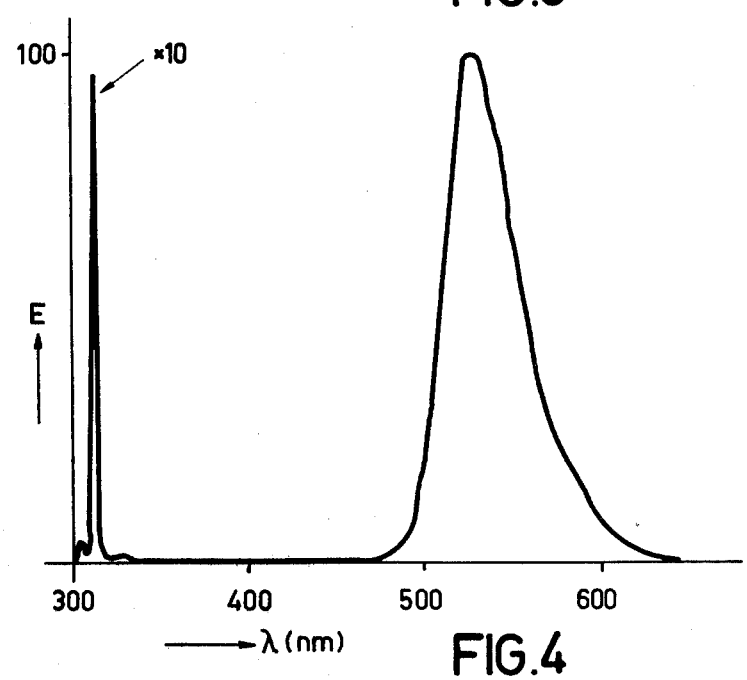

This mixture was heated twice, each time for 1 hour, at 1100° C. in a nitrogen atmosphere. The product obtained was a luminescent phosphate defined by the formula $La_{0.2}Gd_{0.7}Sb_{0.03}Tb_{0.07}PO_4$ and showed the characteristic Tb-emission when excited by 254 nm-radiation. FIG. 3 shows the spectral energy distribution of the emitted radiation. The quantum efficiency of the phosphate was 60%.

EXAMPLES 10 TO 15 INCLUSIVE

Luminescent phosphates were prepared, containing Bi and Dy, Sb and Dy or Sb and Tb in different concentrations as the activators, in addition to Gd, in a similar manner to that described in Example 9. Table III shows the formulae and the q-values measured of these materials.

Table III

| Example | Formula | q (%) |
|---|---|---|
| 10 | $La_{0.285}Gd_{0.70}Bi_{0.01}Dy_{0.005}PO_4$ | 20 |
| 11 | $Gd_{0.985}Sb_{0.01}Dy_{0.005}PO_4$ | 25 |
| 12 | $Gd_{0.97}Sb_{0.02}Dy_{0.01}PO_4$ | 30 |
| 13 | $La_{0.185}Gd_{0.80}Sb_{0.01}Dy_{0.005}PO_4$ | 30 |
| 14 | $La_{0.20}Gd_{0.68}Sb_{0.05}Tb_{0.07}PO_4$ | 50 |
| 15 | $La_{0.20}Gd_{0.72}Sb_{0.01}Tb_{0.07}PO_4$ | 50 |

EXAMPLE 16

A mixture was made of
4.441 g $Gd_2O_3$
1.579 g $La_2O_3$
6.813 g $H_3BO_3$ (5% excess)
0.116 g $Bi_2O_2CO_3$
0.044 g $MnCO_3$.

This mixture was heated twice, each time for 1 hour, at 1000° C. in a nitrogen atmosphere. The product obtained was a luminescent borate defined by the formula $Gd_{0.7}La_{0.277}Bi_{0.013}Mn_{0.01}B_3O_6$ and appeared to luminesce at 254 nm excitation in the green Mn-emission band (with a maximum at approximately 520 nm). FIG.

4 shows the spectral distribution of the emitted radiation. The quantum efficiency was 55%.

EXAMPLES 17 AND 18

Two luminescent borates with different activator contents were prepared in a similar manner to that described in Example 16. Table IV shows the formulae and q-values of these materials.

Table IV

| Example | Formula | q(%) |
| --- | --- | --- |
| 17 | $Gd_{0.89}Bi_{0.01}Mn_{0.10}B_3O_6$ | 20 |
| 18 | $Gd_{0.98}Bi_{0.01}Mn_{0.01}B_3O_6$ | 40 |

EXAMPLES 19 AND 20

A mixture was made of
1.226 g $BaW_3$
4.448 g $Gd_2O_3$
1.867 g $SiO_2$
0.041 g $Pr_2O_3$
0.011 g $Sm_2O_3$.

Figure 6:
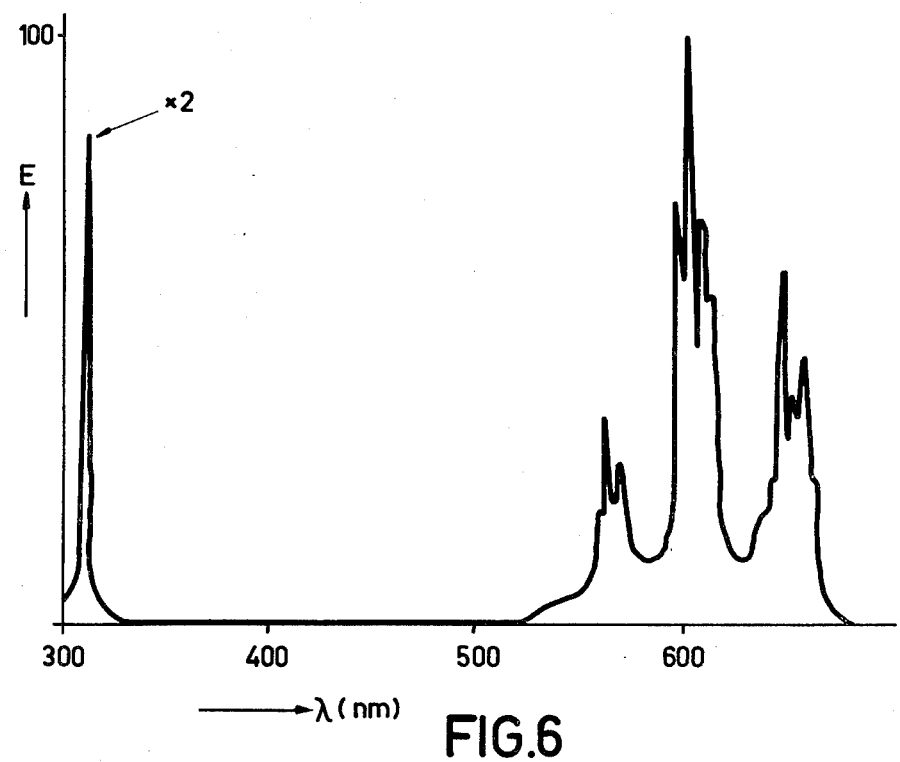

This mixture was heated in a furnace for 15 hours in a nitrogen stream (5 l/min) at 1350° C. The product obtained was a luminescent silicate defined by the formula $BaGd_{3.95}Pr_{0.04}Sm_{0.01}Si_5O_{17}$ and appeared to luminesce at 240 nm excitation in the red part of the spectrum with a quantum efficiency of approximately 45%. FIG. 6 shows the spectral energy distribution of the emitted radiation.

In a similar manner as described above, the firing mixture, however, containing 0.012 g $Dy_2O_3$ instead of the 0.011 g $Sm_2O_3$ indicated above, a luminescent silicate was obtained defined by the formula $BaGd_{3.95}Pr_{0.04}Dy_{0.01}Si_5O_{17}$. This material appeared to furnish at 240 nm excitation the characteristic dysprosium emission is an efficient manner.

FIG. 5 shows schematically and in cross-section a low-pressure mercury vapour discharge lamp provided with a tubular glass wall 1. Electrodes 2 and 3 are disposed, one at each end of the lamp, between which the discharge takes place during operation. The lamp is provided with a mixture of rare gases, serving as the starting gas, and with a small quantity of mercury. The inner surface of the wall 1 is coated with a luminescent layer 4, which contains a luminescent material according to the invention. The layer 4 can be applied in a customary manner to the wall 1, for example by means of a suspension containing the luminescent material.

What is claimed is:

1. A luminescent material having a hexagonal apatite crystal structure characterized in that the material is a silicate defined by the formula $La_{14-x-y-z}Gd_xPb_yTb_zSi_9O_{39}$, where $0.30 \leq x \leq 14-y-z$ $0.005 \leq y \leq 1.5$ $0.05 \leq z \leq 3.5$ and wherein Pb and Tb are in the bivalent state and trivalent state, respectively; said luminescent material absent Tb emitting the characteristic line emission of Gd in the range from 310 to 315 nm when excited by ultraviolet radiation having a predominent wavelength of 255 nm.

2. A luminescent material having a monoclinic crystral structure, characterized in that the material is a silicate defined by the formula $Ba_{1-x}Sr_xY_{4-y-z-a-b}Gd_yPr_zSm_aDy_bSi_5O_{17}$, where $0 \leq x \leq 0.50$ $0.1 \leq y \leq 4-z-a-b$ $0.001 \leq z \leq 0.1$ $0 \leq a \leq 0.1$ $0 \leq b \leq 0.1$ $0.001 \leq a+b$ and wherein Pr, Sm and Dy are in the trivalent state; said luminescent material absent Sm and Dy emitting the characteristic line emission of Gd in the range from 310 to 315 nm when excited by ultraviolet radiation having a predominant wavelength of 254 nm.

3. A luminescent screen comprising a support bearing a luminescent material as claimed in claim 1 or 2.

4. A low-pressure mercury vapour discharge lamp including a luminescent screen as claimed in claim 3.

UNITED STATES PATENT OFFICE
CERTIFICATE OF CORRECTION

Patent No. 4,215,289          Dated July 29, 1980

Inventor(s) Johannes T.W. De Hair et al

It is certified that error appears in the above-identified patent and that said Letters Patent are hereby corrected as shown below:

Col. 8 line 21, After "of" delete "255 nm" and insert -- 254 nm --

Signed and Sealed this

Third Day of February 1981

[SEAL]

Attest:

RENE D. TEGTMEYER

Attesting Officer    Acting Commissioner of Patents and Trademarks